E. G. GAYLORD.
COUPLING.
APPLICATION FILED MAY 11, 1906.
906,217.
Patented Dec. 8, 1908.
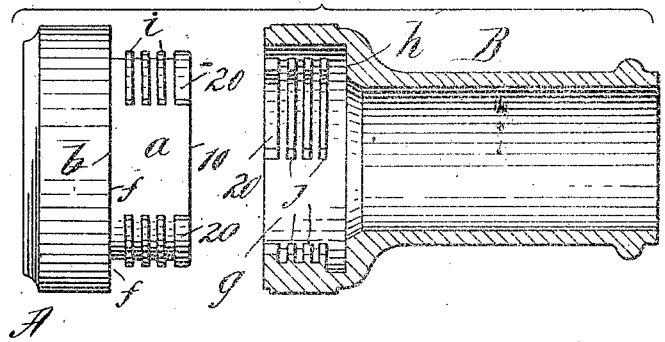
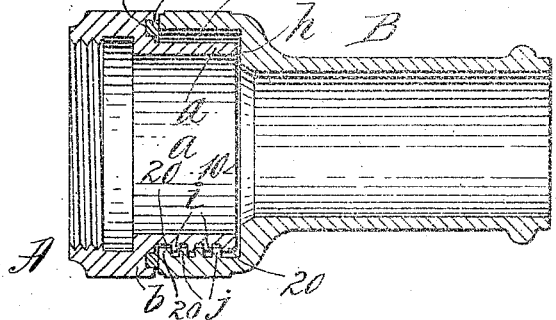
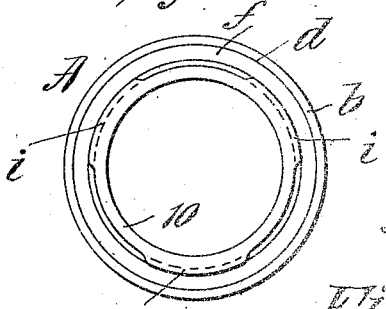 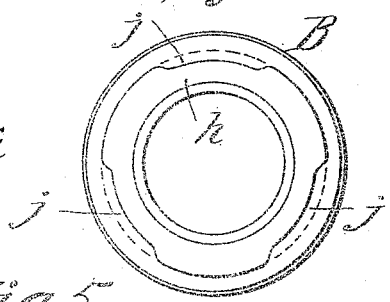
WITNESSES:
H. L. Sprague
R. M. Mowry
INVENTOR.
Emerson G. Gaylord,
BY
W. S. Bellows
ATTORNEY.

UNITED STATES PATENT OFFICE.

EMERSON G. GAYLORD, OF CHICOPEE, MASSACHUSETTS.

COUPLING.

No. 906,217.  Specification of Letters Patent.  Patented Dec. 8, 1908.

Application filed May 11, 1908. Serial No. 432,029.

*To all whom it may concern:*

Be it known that I, EMERSON G. GAYLORD, a citizen of the United States of America, and resident of Chicopee, in the county of Hampden and State of Massachusetts, have invented certain new and useful Improvements in Couplings, of which the following is a full, clear, and exact description.

This invention relates to a coupling for annular metallic sections, such as those comprised between a hose and its nozzle, between two lengths of hose, or for annular sections available in other situations, and pertains in a general way to a somewhat well known description of coupling wherein one of the sections is adapted to be fitted into the other, and in which both are provided with interengaging interrupted, or mutilated, helical threads.

This invention has for its object the attainment of an improved coupling having structural features and consequent advantages which are hereinafter described and explained in conjunction with the accompany drawings in which:—

Figure 1 is in part a side view and in part a central longitudinal sectional view of the coupling sections in separated relations;
Fig. 2 is a central longitudinal sectional view of the sections in coupled relations; Figs. 3 and 4 are end views of the two coupling sections; Fig. 5 is a development showing a peculiarity of construction of the cam ribs for one of the sections.

In the drawings,—A and B represent two annular coupling sections, the one A comprising a cylindrical neck portion $a$ having a shoulder flange $b$ back from its end 10, and provided in the face of said flange which is towards the end of the section with an annular groove $d$ in which is sunk for the greater portion of its bulk a ring $f$ of compressible material, a portion of said ring, which may advantageously be of rubber or the like, projecting slightly beyond the face of the shoulder constituted by said flange. The other section B is constructed with a cylindrical opening $g$ of a diameter larger than the portion of the section forward of its internal shoulder $h$ and both the said neck portion $a$ and the cylindrically recessed portion $g$ of both sections have series of respectively external and internal inter-
engaging cam ribs $i$ and $j$ which are not in continuous lines of helixes or screw threads as heretofore constructed in couplings of this general character, but which, being interrupted by spaces whereby their circumferential continuity is broken are as more definitely indicated by the development in Fig. 5 of the surface of one of the sections on which the interrupted cam ribs are provided, that is to say: The circumferential endwise separated ribs of the several series are located in common planes at right angles to the axis of the annular part on which they are formed, the cam ribs have uniformly inclinations or pitch each from its one end coincident with a given transverse plane, terminating with their end locations in a common plane parallel with and slightly axially removed from the first mentioned plane from which they proceeded.

By making the interengaging ribs $i$ and $j$ as cams having the distinguishing feature last described and exemplified in the diagram, Fig. 5, it becomes immaterial as to which spaces between the ends of ribs of the one section the ribs of the other section of the coupling may be inserted as immediately the sections have rotative movements one relatively to the other, a small fraction of a turn will cause the end of the section D to be forced against the shoulder provided with a packing ring comprised in the flange of the other section A, it being appreciated that the forcing or crowding actions of all of the cam ribs are alike, and in this coupling it never becomes necessary to impart but the small fraction of a rotary movement of the one section relatively to the other to set the tube parts in their firmly closed relations, whereas in coupling sections in which the interrupted threads of true helixes are employed unless the parts are brought to juxtaposition in certain particular relations a much greater rotative movement is required for setting the sections to bottoming connection. And, furthermore, as a safeguard requiring that the one section be moved axially relatively to the other as nearly "home" as it is possible to do, before imparting the turning movements the end ribs of the series on one section have greater widths, as shown at 20, than the other ribs of the series longitudinally therebeyond, while the groove-like recesses in which such ribs 20 are engaged are correspondingly wider than the spaces between the ribs of the narrower dimensions.

I claim:—

Two annular coupling sections, one comprising a cylindrical neck portion having a shoulder flange back from its end and the other comprising a cylindrical opening having an internal shoulder forward of its open end, both the said neck and cylindrically recessed portions having sets of respectively external and internal interrupted and interengaging cam ribs, those of one series being adapted for becoming loosely positioned in the spaces between those of the other and the end ribs of the series on one section having greater widths than the other ribs, and the groove like recesses in the other section in which such widened ribs become engaged by relative rotative movements, being correspondingly wider than the spaces between the ribs, for the purpose set forth.

Signed by me at Springfield, Mass., in presence of two subscribing witnesses.

EMERSON G. GAYLORD.

Witnesses:
WM. S. BELLOWS,
G. R. DRISCOLL.